United States Patent

[19]

Takata et al.

[11] Patent Number: 4,774,274
[45] Date of Patent: Sep. 27, 1988

[54] THERMALLY STABILIZED BUTADIENE RESINS CONTAINING A HINDERED PHENOLIC ACRYLATE OR METHACRYLATE

[75] Inventors: Takeshi Takata, Nishinomiya; Shin-ichi Yachigo, Toyonaka; Tatsuo Kaneoya, Oita; Haruki Okamura, Osaka; Yukoh Takahashi, Toyonaka, all of Japan

[73] Assignee: Sumitomo Chemical Company, Limited, Osaka, Japan

[21] Appl. No.: 64,461

[22] Filed: Jun. 22, 1987

[30] Foreign Application Priority Data

Jun. 25, 1986 [JP] Japan ................. 61-150565
Jul. 23, 1986 [JP] Japan ................. 61-173301

[51] Int. Cl.$^4$ ............................................. C08K 5/10
[52] U.S. Cl. ................................... 524/291; 560/140
[58] Field of Search .................... 524/291; 525/384

[56] References Cited

U.S. PATENT DOCUMENTS 4,168,387  9/1979  Cottman ................. 524/291
4,365,032 12/1982  Yosizato et al. ........... 568/50
4,562,281 12/1985  Takahashi et al. ......... 560/104

Primary Examiner—Veronica P. Hoke
Attorney, Agent, or Firm—Stevens, Davis, Miller & Mosher

[57] ABSTRACT

A process for producing a bisphenol compound useful as deterioration preventor capable of stabilizing organic substances against the decompositions caused by heat, light and oxygen, represented by the following general formula:

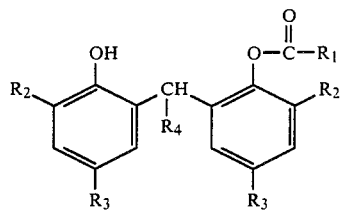

wherein $R_1$ represents alkyl group having 1 to 3 carbon atoms, alkenyl group having 2 to 4 carbon atoms, phenyl group or 2-phenylethenyl group; $R_2$ represents alkyl group having 1 to 5 carbon atoms, or cyclohexyl group; $R_3$ represents alkyl group having 1 to 9 carbon atoms, cyclohexyl group or phenyl group; and $R_4$ represents alkyl group having 1 to 11 carbon atoms or phenyl group, which comprises reacting a carboxylic acid represented by the following general formula:

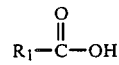

wherein $R_1$ is as defined above, with a bisphenol compound represented by the following general formula:

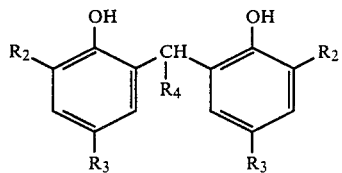

wherein $R_2$, $R_3$ and $R_4$ are as defined above, by the use of a halogenating agent in the presence of a dehydrohalogenating agent, as well as butadiene polymer compositions containing said bisphenol compounds.

6 Claims, No Drawings

THERMALLY STABILIZED BUTADIENE RESINS CONTAINING A HINDERED PHENOLIC ACRYLATE OR METHACRYLATE

The present invention relates to a process for producing bisphenol compounds represented by the following general formula (I):

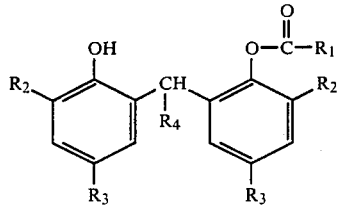

wherein $R_1$ represents alkyl group having 1 to 3 carbon atoms, alkenyl group having 2 to 4 carbon atoms, phenyl group or 2-phenylethenyl group; $R_2$ represents alkyl group having 1 to 5 carbon atoms or cyclohexyl group; $R_3$ represents alkyl group having 1 to 9 carbon atoms, cyclohexyl group or phenyl group; and $R_4$ represents alkyl group having 1 to 11 carbon atoms, which are useful as deterioration preventor capable of stabilizing organic substances against the decompositions caused by heat, light and oxygen, as well as to butadiene polymer compositions containing said bisphenol compounds.

As the process for producing the bisphenol compounds represented by general formula (I), the process mentioned in U.S. Pat. No. 3,984,372 which comprises converting a carboxylic acid to an acid halide by the use of a halogenating agent (e.g. chlorinating agent such as thionyl chloride, phosphorus trichloride, phosphorus pentachloride and the like or brominating agent such as phosphorus tribromide and the like) and then reacting the acid halide with a bisphenol compound in the presence of a dehydrohalogenating agent, the process mentioned in Japanese Patent Application Kokai (Laid-Open) No. 61323/81 which comprises reacting an acid halide or an acid anhydride with a bisphenol compound in the presence of a basic catalyst such as pyridine, dimethylaniline or the like, etc. are hitherto known.

However, according to these processes, the yield of bisphenol compound based on the starting carboxylic acid is necessarily very low, because the process involves two steps and the yield of acid halide or acid anhydride is generally low.

In view of above, the present inventors conducted elaborated studies on a process for producing a bisphenol compound represented by general formula (I) in a high yield not only based on the starting bisphenol compound but also based on the starting carboxylic acid. As the result, a novel production process by which the intended compound can be obtained in one step and in a high yield was discovered.

Thus, the present invention provides a process for producing bisphenol compounds represented by the above-mentioned general formula (I) which comprises reacting a carboxylic acid represented by the following general formula (II):

wherein $R_1$ is as defined above, with a bisphenol compound represented by the following general formula (III):

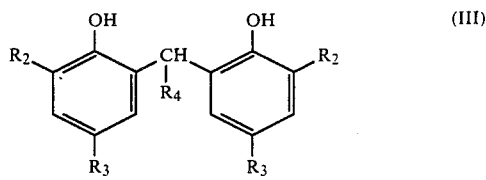

wherein $R_2$, $R_3$ and $R_4$ are as defined above, by the use of a halogenating agent in the presence of a dehydrohalogenating agent.

Concrete examples of the carboxylic acid of general formula (II) usable in the invention include acetic acid, propionic acid, butyric acid, acrylic acid, methacrylic acid, crotonic acid, 3-butenoic acid, benzoic acid, cinnamic acid, and the like. Concrete examples of the bisphenol compound represented by general formula (III) include 2,2'-ethylidenebis(6-t-butyl-4-methylphenol), 2,2'-ethylidenebis(4,6-di-t-butylphenol), 2,2'-butylidenebis(4,6-dimethylphenol), 2,2'-butylidenebis(6-t-butyl-4-methylphenol), 2,2'-butylidenebis(4,6-di-t-butylphenol), 2,2'-butylidenebis(4,6-di-t-amylphenol), 2,2'-octylidenebis(6-t-butyl-4-methylphenol), 2,2'-dodecylidenebis(6-t-butyl-4-methylphenol), 2,2'-benzylidenebis(6-t-butyl-4-methylphenol), 2,2'-benzylidenebis(4,6-di-t-butylphenol), and the like.

Concrete examples of the dehydrohalogenating agent include tertiary amines such as triethylamine, dimethylaniline, N,N-dimethylbenzylamine, tetramethylurea and the like, pyridine, pyridine derivatives such as 4-(N,N-dimethylamino)-pyridine, and the like.

Examples of the halogenating agent include phosphorus oxyhalides such as phosphorus oxychloride, phosphorus oxybromide and the like, and toluenesulfonyl halides such as o-toluenesulfonyl chloride, p-toluenesulfonyl chloride and the like.

The reaction of the present invention is usually carried out in the presence of a solvent. Examples of said solvent include aliphatic hydrocarbons such as n-hexane, n-heptane and the like; alicyclic hydrocarbons such as cyclohexane and the like; aromatic hydrocarbons such as benzene, toluene, xylene and the like; esters such as ethyl acetate, butyl acetate and the like; esters such as diethyl ether, tetrahydrofuran, ethylene glycol dimethyl ether and the like; and halogenated hydrocarbons such as dichloromethane, chloroform, carbon tetrachloride, 1,2-dichloroethane and the like. Among the above-mentioned dehydrohalogenating agents, those which are liquid at room temperature are also usable as said solvent.

In this reaction, the molar ratio of carboxylic acid to bisphenol compound is usually 0.7 to 1.5:1 and more preferably 0.9 to 1.2:1.

The halogenating agent is used in an amount mentioned below. Thus, when it is phosphorus oxychloride or phosphorus oxybromide, its amount is 0.5 to 1.0 mole, preferably 0.6 to 0.9 mole and more preferably 0.65 to 0.8 mole per 1 mole of carboxylic acid. When it is o- or p-toluenesulfonyl chloride, its amount is 0.8 to 1.6 moles and preferably 0.9 to 1.2 moles per 1 mole of carboxylic acid.

The dehydrohalogenating agent is used in an amount mentioned below. Thus, when phosphorus oxychloride or phosphorus oxybromide is used as the halogenating agent, the amount of dehydrohalogenating agent is 2.7 to 3.6 equivalents and preferably 2.9 to 3.2 equivalents per 1 mole of the phosphorus oxychloride or phosphorus oxybromide. When o- or p-toluenesulfonyl chloride is used as the halogenating agent, the amount of dehydrohalogenating agent is 0.8 to 2.4 equivalents and preferably 0.9 to 2.2 equivalents per 1 mole of o- or p-toluenesulfonyl chloride. The term "equivalent" is used herein for the reason that some of the dehydrohalogenating agents such as tetramethylurea can capture two moles of hydrogen halide per one mole of dehydrohalogenating agent.

The reaction temperature is in the range from −20° C. to +150° C., preferably from 0° C. to +120° C. and more preferably from +20° C. to +100° C.

After the reaction, the salt formed from the dehydrohalogenating agent is separated or not separated by filtration or the like; and 1 then the reaction mixture is optionally neutralized, subsequently is washed with water and thereafter the intended product is obtained by evaporating off the solvent from the organic layer; or 2 then the reaction mixture is added with water, subsequently is cooled and thereafter the intended product is obtained by taking out the deposited crystal; or 3 the intended product is separated from the reaction mixture by some other means. The product can further be purified by known procedures such as recrystallization, washing with solvent, etc.

By the above-mentioned process, bisphenol compound of general formula (I) can be produced from carboxylic acid in one step, in a high yield, and easily from the industrial point of view.

Now, butadiene polymers such as solution-polymerized polybutadiene rubber (BR), solution-polymerized styrene-butadiene copolymer rubber (SBR), styrene-butadiene block copolymer (SBS) and the like are usually produced in a hydrocarbon solvent by anionic polymerization using a Ziegler catalyst or organolithium compound as a catalyst. Hitherto, the polymerization solvent has been removed from the solution after the polymerization reaction by the steam stripping method. However, direct solvent drying method capable of decreasing the consumption of steam down to the theoretical minimum has been proposed from the viewpoint of saving energy.

However, this method is usually carried out at a high temperature of about 150°–200° C. which is considerably higher than the boiling point of polymerization solvent. Thus, the problems of gel formation arises in the course of treatment and the coloration of polymer itself occurs after the high temperature treatment. Accordingly, it is desired to improve heat resistance and coloration resistance of butadiene polymers in their production process and particularly in the absence of oxygen.

Further, high impact polystyrene modified with BR, SBR, SBS and the like, as well as SBS itself, are processed by the film extrusion method. As the temperature of this method becomes higher and the processing speed becomes more higher, the tendency of forming fish eye gel increases due to the low heat resistance of the polymer, due to which film properties are greatly deteriorated and coloration takes place.

It is a hitherto known technique to add an antioxidant of phenol type, phosphorus type, sulfur type and the like to butadiene polymer in the course of its production or processing. For example, phenolic antioxidants such as 2,6-di-t-butyl-4-methylphenol, 2,2'-methylenebis(4-methyl-6-t-butylphenol), n-octadecyl 3-(3,5-di-t-butyl-4-hydroxyphenol)-propionate, triethylene glycol bis[3-(3-t-butyl-4-hydroxy-5-methylphenyl)propionate], pentaerythritol-tetrakis[3-(3,5-di-t-butyl-4-hydroxyphenyl)propioate], 1,3,5-trimethyl-2,4,6-tris-(3,5-di-t-butyl-4-hydroxybenzyl)-benzene and the like have been used in the form of single substance, or these phenolic antioxidants have been used in combination with phosphorus type antioxidant such as tris(nonylphenyl)-phosphite, distearyl pentaerythritol diphosphite and the like, or the phenolic antioxidants have been used in combination with sulfur type antioxidant such as dilauryl thiodipropionate, dimyristyl thiodipropionate, distearyl thiodipropionate, pentaerythritol tetrakis(3-laurylthiopropionate) and the like.

However, all these processes are incapable of exhibiting a suffcient preventive effect against the thermal deterioration (gelation) taking place at the time of high temperature treatment for separating butadiene polymer from the polymer solution or at the time of high temperature processing of butadiene polymer.

As a stabilizer for such butadiene polymers, 2-t-butyl-6-(3-t-butyl-2-hydroxy-5-methylbenzyl)-4-methylphenyl acrylate is mentioned in U.S. Pat. No. 4,525,514. Although this stabilizer exhibits a preventive effect against the thermal deterioration (gelation) taking place at the time of high temperature treatment for separating the formed polymer from polymer solution in the production process of butadiene polymer, it has become apparent that this stabilizer is disadvantageous because the separated polymer is practically unsatisfactory in color.

Further, as a coloration-resistant antioxidant for preventing various synthetic resins from the coloration due to oxidative deterioration in the presence of oxygen, U.S. Pat. No. 4,365,032 has proposed monoester compounds of 2,2'-alkylidenebis(4,6-di-substituted phenol). However, in the specification of this patent, the prevention of thermal deterioration and coloration taking place at the time of high temperature treatment, in the absence of oxygen, for separating the formed butadiene polymer from polymer solution in the production process of butadiene polymer or at the time of its high temperature processing is not mentioned at all. Further, the monoester compounds of 2,2'-alkylidenebis(4,6-di-substituted phenol) of which 4-position is substituted by methyl, ethyl or propyl group do not exhibit any sufficient preventive effect against the thermal deterioration and coloration, in the absence of oxygen, of butadiene polymer at the time of high temperature treatment for separating the butadiene polymer from polymer solution in the production process of butadiene polymer or at the time of its high temperature processing.

In view of above, the present inventors conducted many studies with the aim of preventing the thermal deterioration (gelatin) and coloration, in the absence of oxygen, taking place at the time of high temperature treatment for separating butadiene polymer from polymer solution in the production process of butadiene polymer or at the time of its high temperature processing. As the result, it was found that, among the above-mentioned bisphenol compounds represented by general formula (I), the specified compounds represented by the following general formula (IV):

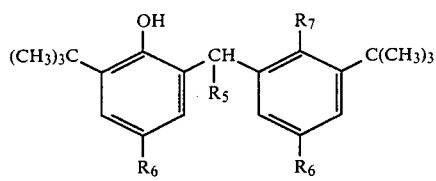

wherein $R_5$ represents alkyl group having 1 to 4 carbon atoms, $R_6$ represents $-C(CH_3)_2-R'$ ($R'$ represents alkyl group having 1 to 5 carbon atoms or phenyl group) or phenyl group, and $R_7$ represents acrylate residue or methacrylate residue, are quite effective as a stabilizer for butadiene polymers in the absence of oxygen, and that a butadiene polymer composition containing the bisphenol compound (IV) in an amount of 0.05 to 2 parts by weight per 100 parts by weight of butadiene polymer is quite stable to the thermal deterioration and coloration in the absence of oxygen.

In the bisphenol compounds represented by general formula (IV), a smaller carbon number of the alkyl group of group $R_5$ is more preferable, and methyl group is most preferable, from the viewpoint of preventing the gelation of butadiene polymer at high temperatures. Further, $R_6$ is preferably a group represented by $-C(CH_3)_2-R'$ having a tertiary carbon atom or phenyl group from the viewpoint of preventing the coloration of butadiene polymer. As said group having tertiary carbon atom, t-butyl, t-amyl and t-octyl are preferable, among which t-butyl group is most preferable.

Next, typical examples of the bisphenol compound represented by general formula (IV) will be shown in Table 1. In the structural formulas of Table 1, ─┼─ denotes t-butyl, ─┼─ denotes t-amyl, and ─┼─ denotes t-octyl group.

TABLE 1

| No. | Structural formula |
|---|---|
| 1 | (structure with OH, CH/CH₃ bridge, OC(=O)—CH=CH₂, two t-butyl groups) |
| 2 | (structure with OH, CH/CH₃ bridge, OC(=O)—C(CH₃)=CH₂, two t-butyl groups) |

TABLE 1-continued

| No. | Structural formula |
|---|---|
| 3 | (structure with OH, CH/CH₃ bridge, OC(=O)—CH=CH₂, two phenyl substituents) |
| 4 | (structure with OH, CH/CH₃ bridge, OC(=O)—C(CH₃)=CH₂, two phenyl substituents) |
| 5 | (structure with OH, CH/C₃H₇ bridge, OC(=O)—CH=CH₂, two t-butyl groups) |
| 6 | (structure with OH, CH/C₃H₇ bridge, OC(=O)—C(CH₃)=CH₂, two t-butyl groups) |
| 7 | (structure with OH, CH/CH₃ bridge, OC(=O)—CH=CH₂, two t-amyl groups) |
| 8 | (structure with OH, CH/CH₃ bridge, OC(=O)—CH=CH₂, two t-octyl groups) |

TABLE 1-continued

| No. | Structural formula |
|---|---|
| 9 | (bisphenol structure with OH, acrylate ester OC-CH=CH2, CH-CH3 bridge, and two cumyl-substituted phenyl groups with H3C-C-CH3 and phenyl substituents) |

In the invention, the content of the bisphenol compound (IV) in butadiene polymer is 0.05 to 2 parts by weight and preferably 0.1 to 1 part by weight, per 100 parts by weight of butadiene polymer.

If the content of bisphenol compound (IV) is lower than 0.05 part by weight, the intended effect cannot be exhibited sufficiently. If its content is higher than 2 parts by weight, the effect given by it is not so high and the use of such large an amount merely brings about an economical disadvantage.

As the method for incorporating the bisphenol compound (IV) into butadiene polymer, adding it into reaction mixture after completion of the polymerization can be adopted, for example.

The butadiene polymer composition of the invention contains the above-mentioned bisphenol compound (IV) as a stabilizer. If desired, other additives such as ultraviolet absorber, light stabilizer, antioxidant, metal inactivator, metallic soap, nucleating agent, slipper, antistatic agent, flame retardant, pigment, filler and the like may also be incorporated thereinto.

Concrete examples of these additives will be mentioned below. Examples of said ultraviolet absorber and hindered amine type light stabilizer include 2-hydroxy-4-methoxybenzophenone, 2-hydroxy-4-n-octoxybenzophenone, 2-(2-hydroxy-5-methylphenyl)benzpotriazole, 2-(2-hydroxy-3-t-butyl-5-methylphenyl)-5-chlorobenzotriazole, 2-(2-hydroxy-3,5-di-t-butylphenyl)-5-chlorobenzotriazole, 2-(2-hydroxy-3,5-diamylphenyl)benzotriazole, 2,4-di-t-butylphenyl 3,5-di-t-butyl-4-hydroxybenzoate, [2,2'-thiobis(4-t-octylphenolate)]butylamine Ni salt, 2,2,6,6-tetramethyl-4-piperidylbenzoate, bis(2,2,6,6-tetramethyl-4-piperidyl)sebacate, 2-(3,5-di-t-butyl-4-hydroxybenzyl)-2-n-butylmalonic acid bis(1,2,2,6,6-pentamethyl-4-piperidyl), 1-[2-{3-(3,5-di-t-butyl-4-hydroxyphenyl)propionyloxy}ethyl]-4-[3-(3,5-di-t-butyl-4-hydroxyphenyl)propionyloxy]-2,2,6,6-tetramethylpiperidine, polycondensate of dimethyl succinate and 1-(2-hydroxyethyl)-4-hydroxy-2,2,6,6-tetramethylpiperidine, poly{[6-(1,1,3,3,-tetramethylbutyl)amino-1,3,5-triazin-2,4-diyl][(2,2,6,6-tetramethyl-4-piperidyl)imino]-hexamethylene-[(2,2,6,6-tetramethyl-4-piperidyl)imino]}, poly{6-[morpholino-1,3,5-triazin-2,4-diyl][(2,2,6.6-tetramethyl-4-piperidyl)imino]hexamethylene-[(2,2,6,6-tetramethyl-4-piperidyl)imino]}, 2-methyl-2-(2,2,6,6-tetramethyl-4-piperidyl)amino-N-(2,2,6,6-tetramethyl-4-piperidyl)propionamide, and the like.

Examples of said sulfur type antioxidant include dilauryl thiodipropionate, distearyl thiodipropionate, dimyristyl thiodipropionate, pentaerythritol tetrakis(3-lauryl thiopropionate), 3,9-bis(2-dodecylthioethyl)-2,4,8,10-tetraoxaspiro-[5,5]-undecane, and the like.

Examples of said phosphorus type antioxidant include distearyl pentaerythritol diphosphite, tris(2,4-di-t-butylphenyl)phosphite, tris(2-t-butyl-4-methylphenyl)phosphite, bis(2,4-di-t-butylphenyl)pentaerythritol diphosphite, tetrakis(2,4-di-t-butylphenyl)-4,4'-biphenylene diphosphite, and the like.

The butadiene polymers to which the present invention is applicable include solution-polymerized polybutadiene rubber (BR), solution-polymerized styrene-butadiene copolymer rubber (SBR), styrene-butadiene block copolymer (SBS), high impact polystyrene (HIPS) modified with BR, SBR or SBS, and the like. These butadiene polymers may be used either alone or in combination with other polymer.

The butadiene polymer composition of the present invention containing the specified bisphenol compound (IV) of the invention is quite stable to the gelation and coloration caused by thermal deterioration. If the formed polymer is separated from the polymer solution by a high temperature treatment after completion of the polymerization, therefore, a product free from gel formation and coloration can be obtained with a high stability. Further, the product of the invention is stable to the thermal deterioration taking place at the time of processings such as injection molding, extrusion and the like. Thus, the formation of fish eye gel in the film forming process and the formation of micro gel in the injection molding process, causing the deteriorations in gloss and transparency, can be prevented, and a high quality product free from coloration can be obtained.

Next, working examples of the present invention will be mentioned.

EXAMPLE 1

Into a 2 liter four-necked flask equipped with a thermometer, a stirrer, a condenser and a dropping funnel were charged 354.5 g (1.0 mole) of 2,2'-ethylidenebis(6-t-butyl-4-methylphenol), 72.06 g (1.0 mole) of acrylic acid, 500 g of toluene and 209.47 g (2.07 moles) of triethylamine. After replacing the inner atmosphere of the flask with nitrogen gas, 105.8 g (0.69 mole) of phosphorus oxychloride was dropwise added while stirring the content of the flask. After dropping it, the resulting mixture was kept hot at 80° C. for one hour. Then, the organic layer was washed with water until it reached neutrality, and the toluene was distilled off under reduced pressure. n-Hexane was added to the residue and recrystallization was carried out. Thus, 388.2 g (yield 95%) of 2,2'-ethylidenebis(6-t-butyl-4-methylphenol)-monoacrylate was obtained as a white crystal having a melting point of 161°-162° C.

EXAMPLE 2

Into the same flask as used in Example 1 were charged 438.7 g (1.0 mole) of 2,2'-ethylidenebis(4,6-di-t-butylphenol), 72.06 g (1.0 mole) of acrylic acid, 400 g of n-heptane and 212.5 g (2.10 moles) of triethylamine. After replacing the inner atmosphere of the flask with nitrogen gas, 200.7 g (0.70 mole) of phosphorus oxybromide was dropwide added with stirring. After dropping it, the resulting mixture was kept hot at 80° C. for one hours. Then, 500 g of water was added, the mixture was cooled to room temperature, and the product was collected by filtration. The product thus obtained was washed with water until the washings reached neutrality. Thus, 468.1 g of 2,2'-ethylidenebis(4,6-di-t-butylphenol)monoacrylate was obtained as a white crystal having a melting point of 189°–190° C. (Compound No. 1 of Table 1).

EXAMPLE 3

Reaction and after treatment were carried out under the same conditions as in Example 1, except that 382.6 g (1.0 mole) of 2,2′-butylidenebis(6-t-butyl-4-methylphenol) was used. Thus, 410.4 g of 2,2′-butylidene-bis(6-t-butyl-4-methylphenol)monoacrylate was obtained as a white crystal having a melting point of 106°–180° C.

EXAMPLE 4

Into the same flask as used in Example 1 were charged 466.8 g (1.0 mole) of 2,2′-butylidenebis(4,6-di-t-butylphenol), 72.06 g (1.0 mole) of acrylic acid, 600 g of toluene and 242.86 g (2.4 moles) of triethylamine. After replacing the inner atmosphere of the flask with nitrogen gas, 229.14 g (1.2 moles) of o-toluenesulfonyl chloride was dropwise added with stirring. After dropping it, the resulting mixture was kept hot at 90° C. for one hour. Then, the organic layer was washed with water until it reached neutrality, and the toluene was distilled off under reduced pressure. n-Hexane was added to the residue and a recrystallization was carried out. Thus, 497.4 g (yield 95.5%) of 2,2′-butylidenebis(4,6-di-t-butylphenol)monoacrylate was obtained as a white crystal having a melting point of 190°–194° C. (Compound No. 5 of Table 1).

EXAMPLE 5

Reaction and after treatment were carried out under the same conditions as in Example 4, except that 522.8 g (1.0 mole) of 2,2′-butylidenebis(4,6-di-t-amylphenol) was used. Thus, 539.4 g (yield 93.5%) of 2,2′-butylidenebis(4,6-di-t-amylphenol)monoacrylate was obtained as a white crystal having a melting point of 129°–131° C.

EXAMPLE 6

Into the same flask as used in Example 1 were charged 298.4 g (1.0 mole) of 2,2′-butylidenebis(4,6-dimethylphenol), 122.12 g (1.0 mole) of benzoic acid, 500 g of toluene and 242.86 g (2.4 moles) of triethylamine. After replacing the inner atmosphere of the flask with nitrogen gas, 229.15 g (1.2 moles) of o-toluenesulfonyl chloride was dropwise added with stirring. After dropping it, the content of the flask was kept hot and after-treated in the same manner as in Example 4. Thus, 395.4 g (yield 98.2%) of 2,2′-butylidenebis(4,6-dimethylphenol)monobenzoate was obtained as a white crystal having a melting point of 129°–130° C.

EXAMPLE 7

Reaction and after treatment were carried out under the same conditions as in Example 1, except that 438.7 g (1.0 mole) of 2,2′-octylidenebis(6-t-butyl-4-methylphenol) was used. Thus, 478 g (yield 97%) of 2,2′-octylidenebis(6-t-butyl-4-methylphenol)monoacrylate was obtained as a white crystal having a melting point of 106°–107° C.

EXAMPLE 8

Reaction and after treatment were carried out under the same conditions as in Example 4, except that 522.9 g (1.0 mole) of 2,2′-octylidenebis(4,6-di-t-butylphenol) was used. Thus, 556.7 g (yield 96.5%) of 2,2′-octylidenebis(4,6-di-t-butylphenol)monoacrylate was obtained as a white crystal having a melting point of 126°–127° C.

EXAMPLE 9

Into a 2 liter four-necked flask equipped with a thermometer, a stirrer, a condenser and a charging device were charged 494.8 g (1.0 mole) of 2,2′-dodecylidenebis(6-t-butyl-4-methylphenol), 72.06 g (1.0 mole) of acrylic acid and 800 g of triethylamine. After replacing the inner atmosphere of the flask with nitrogen gas, 305.52 g (1.6 moles) of p-toluenesulfonyl chloride was portionwise added. After adding it, the resulting mixture was kept at 60° C. for one hour with stirring, and then the resulting triethylamine hydrochloride was filtered off at room temperature. The triethylamine hydrochloride cake was further washed with toluene and filtered, and the washings and filtrate were combined with the main filtrate. By distilling off the solvent under reduced pressure, there was obtained 537.9 g (yield 98%) of 2,2′-dodecylidenebis(6-t-butyl-4-methylphenol)monoacrylate as a transparent oily product.

EXAMPLE 10

Reaction and after treatment were carried out under the same conditions as in Example 1, except that 416.6 g (1.0 mole) of 2,2′-benzylidenebis(6-t-butyl-4-methylphenol) was used. Thus, 458.9 g (yield 97.5%) of 2,2′-benzylidenebis(6-t-butyl-4-methylphenol)monoacrylate was obtained as a white crystal having a melting point of 152°–153° C.

EXAMPLE 11

Reaction and after treatment were carried out under the same conditions as in Example 4, except that 500.8 g (1.0 mole) of 2,2′-benzylidenebis(4,6-di-t-butylphenol) was used. Thus, 538.2 g (yield 97%) of 2,2′-benzylidenebis(4,6-di-t-butylphenol) was obtained as a white crystal having a melting point of 165°–167° C.

EXAMPLES 12 AND 13

According to the procedure of Example 2, 2,2′-ethylidenebis(4,6-di-t-butylphenol)monomethacrylate (Compound No. 2 of Table 1) and 2,2′-ethylidenebis(6-phenyl-4-t-butylphenol)monoacrylate (Compound No. 3 of Table 1) were prepared.

COMPARATIVE EXAMPLE 1

Into a 500 ml four-necked flask equipped with a thermometer, a stirrer, a condenser and a dropping funnel were charged 144.1 g (2.0 moles) of 99.8% acrylic acid, 2.0 g (0.03 mole) of N,N-dimethylformamide and 1.44 g (0.01 mole) of hydroquinone. While stirring the mixture at an inner temperature of 50° C., 238.0 g (2.0 moles) of thionyl chloride was dropwise added thereto. After dropping it, the resulting mixture was kept hot for 30 minutes, and then 0.14 g (0.0013 mole) of cuprous chloride was added and the product was distilled at ordinary pressure. The fraction distilling in the temperature range from 71° C. to 85° C. was collected. Thus, 70.60 g (yield 39%) of acrylic acid chloride was obtained.

Next, into a 500 ml four-necked flask equipped with a thermometer, a stirrer, a condenser and a dropping funnel were charged 85.4 g (0.241 mole) of 2,2′-ethylidenebis(6-t-butyl-4-methylphenol), 200 g of toluene and 23.9 g (0.290 mole) of triethylamine. After replacing the inner atmosphere of the flask with nitrogen gas, 25 g (0.276 mole) of acrylic acid chloride was dropwise added thereto with stirring. After dropping it, the resulting mixture was stirred for an additional one hour, and then the excessive triethylamine was neutralized with dilute hydrochloric acid and the resulting triethylamine hydrochloride was washed away with water. Toluene was distilled off from the toluene layer which had been washed with water, and the residue of the distrillation was mixed with 20 g of n-hexane and recrystallized. Thus, 93.5 g (yield 95%) of 2,2′-ethylidenebis(6-t-butyl-4-methylphenol)monoacrylate was obtained as a white crystal having a melting point of 161°–162° C.

Its yield was 37.1%, based on acrylic acid.

EXAMPLE 14

In an atmosphere of nitrogen gas, 1,3-butadiene was polymerized in n-hexane at a temperature of 60° to 65° C. in the presence of n-butyllithium as a catalyst. As polymerization stopper, isopropyl alcohol was used. After completion of the polymerization, a predetermined amount of test compound shown in Table 3 was added, and then the n-hexane was removed by flash evaporation at a temperature of 190° C. to 200° C. in an atmosphere of nitrogen gas. Thus, a polybutadiene rubber composition was obtained. In Table 3, the amount of test compound added is expressed in terms of parts by weight per 100 parts by weight of polybutadiene.

The polybutadiene rubber composition thus obtained was subjected to a kneading test under a stream of nitrogen gas by means of Laboplastmill (Model 40-100, manufactured by Toyo Seiki K.K.). The preventive effect of the composition against the gelation taking place at the time of kneading was evaluated by referring to the torque behavior accompanying the gelation. The results are shown in Table 3.

In Table 3, the gelation-preventive effect is expressed by "time of gelation" (the period of time required for reaching peak value of torque). A longer time of gelation means a more excellent gelation-preventive effect.

| [Conditions of the Test Using Laboplastmill] | |
|---|---|
| (1) Mixer | Model R-60 |
| (2) Range of torque measurement | 0 to 500 kg-cm |
| (3) Amount of charged composition | 80 g |
| (4) Flow rate of nitrogen gas | 1 liter/minute |
| (5) Test temperature | 180° C. |
| (6) Rotation speed | 10 r.p.m. in the period of preheating (8 min.); 60 r.p.m. thereafter |

In the production of polybutadiene rubber, the coloration after high temperature treatment was visually evaluated. The results were expressed by the following marks:

O: No color
Δ: Light yellow color
X: Yellow color

The comparative compounds used for the purpose of comparison were as shown in Table 2, wherein ✛ means t-butyl group and

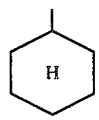

means cyclohexyl group.

TABLE 2

| No. | Structural formula |
|---|---|
| AO-I | 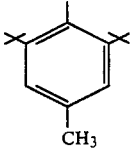 |
| AO-II | 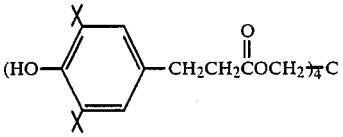 |
| AO-III | 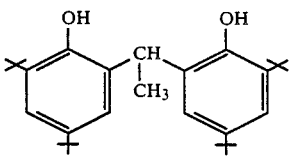 |
| AO-IV | 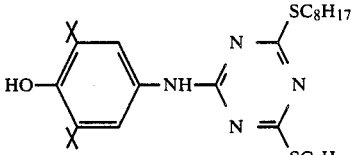 |
| AO-V | 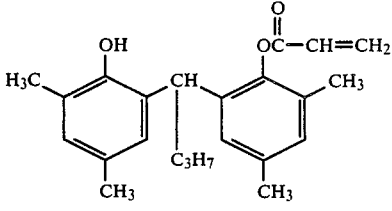 |
| AO-VI | 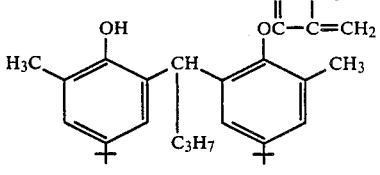 |
| AO-VII | 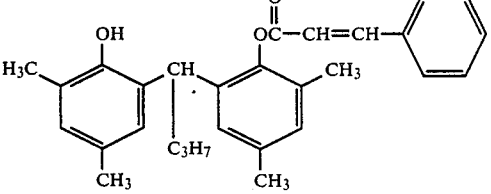 |
| AO-VIII | 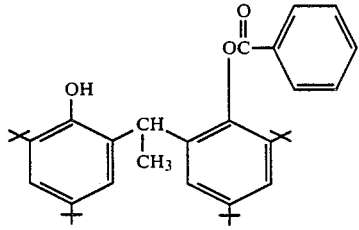 |

TABLE 2-continued

| No. | Structural formula |
|---|---|
| AO-IX | (structure: bis-phenol with cyclohexyl, methyl groups, OH, CH₂ bridge, and OC(=O)—CH=CH—CH₃ ester) |
| AO-X | (structure: bis-phenol with OH, CH₂ bridge, CH₃ groups, and OC(=O)—CH=CH₂ ester) | sequently, 20 parts by weight of styrene, 15 parts by weight of 1,3-butadiene and 45 parts by weight of styrene were successively added, and they were successively polymerized under the condition of 70° C.×1 hour. After the polymerizations had been completed, a predetermined amount of test compound shown in Table 4 was added and then cyclohexane was removed by heating the mixture in an atmosphere of nitrogen gas. As the result, there was obtained a block copolymer composition having a B-A-B structure of which butadiene content was 35% by weight.

In Table 4, the amount of test compound added is expressed in terms of part by weight per 100 parts by weight of block copolymer.

The block copolymer compositions thus obtained were subjected to a strand fall extrusion test by the use of Laboplastmill Extruder. The gel content in the stranded product thus obtained was evaluated by referring to its toluene-insoluble fraction. Thus, gel content was determined by dipping about one gram of accurately weighed out stranded product sample into 200 ml of toluene, stirring it for 24 hours, collecting it by filtration using a 200 mesh wire gauze, drying the unfiltered

TABLE 3

| | Example of the invention | | | | | | | | Comparative example | | | | |
|---|---|---|---|---|---|---|---|---|---|---|---|---|---|
| Test compound | 1 | 2 | 3 | 4 | 5 | 6 | 7 | 8 | 9 | 10 | 11 | 12 | 13 |
| Compound of the invention (Table 1) | | | | | | | | | | | | | |
| No. 1 | 0.2 | 0.4 | | | | | | | | | | | |
| No. 2 | | | 0.2 | 0.4 | | | | | | | | | |
| No. 3 | | | | | 0.2 | 0.4 | | | | | | | |
| No. 5 | | | | | | | 0.2 | 0.4 | | | | | |
| Comparative compound (Table 2) | | | | | | | | | | | | | |
| AO-I | | | | | | | | | 0.4 | 0.8 | | | |
| AO-II | | | | | | | | | | | 0.4 | 0.8 | |
| AO-III | | | | | | | | | | | | | 0.4 |
| AO-IV | | | | | | | | | | | | | |
| AO-V | | | | | | | | | | | | | |
| AO-VIII | | | | | | | | | | | | | |
| AO-IX | | | | | | | | | | | | | |
| AO-X | | | | | | | | | | | | | |
| Time of gelation (min) | 45 | 67 | 44 | 65 | 42 | 62 | 43 | 65 | 10 | 14 | 7 | 11 | 7 |
| Coloration of BR | o | o | o | o | o | o | o | o | o | Δ | o | o | Δ |

| | Comparative example No. | | | | | | | | | | | |
|---|---|---|---|---|---|---|---|---|---|---|---|---|
| Test compound | 14 | 15 | 16 | 17 | 18 | 19 | 20 | 21 | 22 | 23 | 24 | 25 |
| Compound of the invention (Table 1) | | | | | | | | | | | | |
| No. 1 | | | | | | | | | | | | None |
| No. 2 | | | | | | | | | | | | |
| No. 3 | | | | | | | | | | | | |
| No. 5 | | | | | | | | | | | | |
| Comparative compound (Table 2) | | | | | | | | | | | | |
| AO-I | | | | | | | | | | | | |
| AO-II | | | | | | | | | | | | |
| AO-III | 0.8 | | | | | | | | | | | |
| AO-IV | | 0.4 | 0.8 | | | | | | | | | |
| AO-V | | | | 0.4 | 0.8 | | | | | | | |
| AO-VII | | | | | | 0.4 | 0.8 | | | | | |
| AO-IX | | | | | | | | 0.4 | 0.8 | | | |
| AO-X | | | | | | | | | | 0.4 | 0.8 | |
| Time of gelation (min) | 10 | 8 | 12 | 21 | 28 | 15 | 22 | 9 | 14 | 31 | 42 | 5 |
| Coloration of BR | x | o | o | Δ | x | o | o | Δ | x | Δ | x | x |

EXAMPLE 15

In an atmosphere of nitrogen gas, 0.08 part by weight of n-butyllithium was added to a solution of 20 parts by weight of 1,3-butadiene in cyclohexane, and the 1,3-butadiene was polymerized at 70° C. for one hour. Subsequently, matter, weighing it, and calculating the gel content from the weight difference before and after the test. The results are shown in Table 4.

| [Conditions of Test] | |
|---|---|
| (1) | Testing machine: Laboplastmill Model 40-100 (manufactured by Toyo Seiki K.K.) |
| (2) | Extruder: Model D20-25, manufactured by toyo Seiki K.K |
| (3) | Conditions of measurement: |
| | Diameter of strand die  0.5 mm $\phi$ |
| | Cylinder temperature  230–260° C. |
| | Rotation speed  8 r.p.m. |
| | Distance of fall  93 cm |

Further, the extent of coloration in the stranded sample which had been obtained by high temperature processing of styrenebutadiene copolymer (SBS) in the above-mentioned manner was visually evaluated, and the results were expressed by the following marks:

O: No color
Δ: Light yellow color
X: Yellow color

TABLE 4

| Test compound | Example of the invention No. | | | | | | | | Comparative example No. | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Compound of the invention (Table 1) | | | | | | | | | | | | | |
| No. 1 | 0.2 | 0.4 | | | | | | | | | | | |
| No. 2 | | | 0.2 | 0.4 | | | | | | | | | |
| No. 3 | | | | | 0.2 | 0.4 | | | | | | | |
| No. 5 | | | | | | | 0.2 | 0.4 | | | | | |
| Comparative compound (Table 2) | | | | | | | | | | | | | |
| AO-I | | | | | | | | | 0.4 | 0.8 | | | |
| AO-II | | | | | | | | | | | 0.4 | 0.8 | |
| AO-III | | | | | | | | | | | | | 0.4 |
| AO-IV | | | | | | | | | | | | | |
| AO-V | | | | | | | | | | | | | |
| AO-VI | | | | | | | | | | | | | |
| AO-VII | | | | | | | | | | | | | |
| AO-X | | | | | | | | | | | | | |
| Gel content (% by wt.) | 0.0 | 0.0 | 0.0 | 0.0 | 0.1 | 0.0 | 0.1 | 0.0 | 7 | 5 | 14 | 11 | 16 |
| Coloration of SBS | o | o | o | o | o | o | o | o | o | Δ | o | o | Δ |

| Test compound | Comparative example No. | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 |
| Compound of the invention (Table 1) | | | | | | | | | | | | |
| No. 1 | | | | | | | | | | | | None |
| No. 2 | | | | | | | | | | | | |
| No. 3 | | | | | | | | | | | | |
| No. 5 | | | | | | | | | | | | |
| Comparative compound (Table 2) | | | | | | | | | | | | |
| AO-I | | | | | | | | | | | | |
| AO-II | | | | | | | | | | | | |
| AO-III | | | | | | | | | | | | |
| AO-IV | 0.4 | 0.8 | | | | | | | | | | |
| AO-V | | | 0.4 | 0.8 | | | | | | | | |
| AO-VI | | | | | 0.4 | 0.8 | | | | | | |
| AO-VII | | | | | | | 0.4 | 0.8 | | | | |
| AO-X | | | | | | | | | 0.4 | 0.8 | | |
| Gel content (% by wt.) | 11 | 10 | 7 | 4 | 3 | 5 | 3 | 9 | 6 | 0.7 | 0.4 | 82 |
| Coloration of SBS | x | o | o | Δ | x | o | o | Δ | x | Δ | x | x |

What is claimed is:

1. A butadiene polymer composition containing a bisphenol compound represented by the following formula:

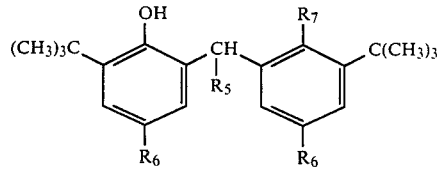

wherein $R_5$ represents alkyl group having 1 to 4 carbon atoms; $R_6$ represents $-C(CH_3)_2-R'$ ($R'$ is alkyl group having 1 to 5 carbon atoms or phenyl group) or phenyl group; and $R_7$ represents acrylate residue or methacrylate residue, in an amount of 0.05 to 2 parts by weight per 100 parts by weight of butadiene polymer.

2. A butadiene polymer composition according to claim 1, wherein $R_5$ in the formula is methyl group.

3. A butadiene polymer composition according to claim 1, wherein $R_6$ in the formula is t-butyl group, t-amyl group, t-octyl group or phenyl group.

4. A butadiene polymer composition according to claim 1, wherein said butadiene polymer is a solution-polymerized butadiene rubber, a solution-polymerized styrene-butadiene copolymer rubber or a styrene-butadiene block copolymer.

5. A butadiene polymer composition according to claim 1, wherein the content of said bisphenol compound is 0.1 to 1 part by weight per 100 parts by weight of butadiene polymer.

6. A butadiene polymer composition according to claim 2, wherein $R_6$ in the formula is t-butyl group, t-amyl group, t-octyl group or phenyl group.

* * * * *